United States Patent [19]
Sandri et al.

[11] Patent Number: 5,745,352
[45] Date of Patent: Apr. 28, 1998

[54] DC-TO-DC CONVERTER FUNCTIONING IN A PULSE-SKIPPING MODE WITH LOW POWER CONSUMPTION AND PWM INHIBIT

[75] Inventors: Paolo Sandri, Milan; Maria Rosa Borghi, Marcallo con Casone; Luca Rigazio, Cigliano, all of Italy

[73] Assignee: SGS-Thomson Microelectronics S.r.l., Agrate Brianza, Italy

[21] Appl. No.: 772,303

[22] Filed: Dec. 23, 1996

Related U.S. Application Data

[63] Continuation of Ser. No. 549,340, Oct. 27, 1995, abandoned, which is a continuation of Ser. No. 549,601, Oct. 27, 1995, abandoned.

[30] Foreign Application Priority Data

Oct. 27, 1994 [EP] European Pat. Off. ............ 94830507

[51] Int. Cl.$^6$ ................... H02M 1/12; G05F 1/10
[52] U.S. Cl. .................... 363/41; 363/131; 323/222; 323/285
[58] Field of Search ................... 363/41, 74, 78, 363/80, 131; 323/222, 285

[56] References Cited

U.S. PATENT DOCUMENTS

| | | | |
|---|---|---|---|
| 3,621,372 | 11/1971 | Hron | 323/287 |
| 3,675,158 | 7/1972 | Judd et al. | 323/286 |
| 3,913,006 | 10/1975 | Fillmore | 323/222 |
| 4,322,786 | 3/1982 | Weber | 363/21 |
| 5,469,349 | 11/1995 | Marinus | 363/41 |
| 5,481,178 | 1/1996 | Wilcox et al. | 323/287 |
| 5,528,125 | 6/1996 | Marshall et al. | 323/222 |
| 5,528,132 | 6/1996 | Doluca | 323/284 |
| 5,532,577 | 7/1996 | Doluca | 323/282 |
| 5,589,759 | 12/1996 | Borgato et al. | 323/222 |
| 5,612,610 | 3/1997 | Borghi et al. | 323/222 |
| 5,629,610 | 5/1997 | Pedrazzini et al. | 323/285 |
| 5,633,788 | 5/1997 | Tanaka et al. | 363/41 |
| 5,657,215 | 8/1997 | Faulk | 363/41 |

FOREIGN PATENT DOCUMENTS

| | | |
|---|---|---|
| 0583038 | 9/1993 | European Pat. Off. |
| 2610149 | 7/1988 | France . |

*Primary Examiner*—Stuart N. Hecker
*Attorney, Agent, or Firm*—David V. Carlson; Bryan A. Santarelli; Seed and Berry LLP

[57] ABSTRACT

Switching losses in a DC-to-DC converter idling in a pulse-skipping mode are reduced by inhibiting any intervening turn-off command by a PWM control loop of the converter for as long as the current through the inductor of the converter remains below a minimum threshold value set by a dedicated comparator. The method is implemented by employing a comparator with a certain hysteresis and by logically masking the switching to a logic "0" of a high frequency clock (switching) signal of the converter for the entire period of time the current in the inductor remains below the minimum threshold.

20 Claims, 7 Drawing Sheets

Fig. 8

DC-TO-DC CONVERTER FUNCTIONING IN A PULSE-SKIPPING MODE WITH LOW POWER CONSUMPTION AND PWM INHIBIT

CROSS-REFERENCE TO RELATED APPLICATIONS

This application is a continuation of U.S. application Ser. No. 08/549,340 filed Oct. 27, 1995, now abandoned, which is a continuation of U.S. application Ser. No. 08/549,601 filed Oct. 27, 1995, now abandoned.

This application claims priority from EP 94830507.3, filed Oct. 27, 1994, which is hereby incorporated by reference.

BACKGROUND AND SUMMARY OF THE INVENTION

The present invention relates to a static DC-to-DC converter with an improved behavior in terms of reduction of power consumption under variable load level.

In switching type static converters, the conversion efficiency may be improved by reducing conduction losses in the switch, due to the internal resistance of the switch and proportional to the operation current, and/or the switching losses that depend on the frequency and speed of transitions. Normally, a converter is designed in function of a design level of the switched current under normal conditions of operation, by establishing, case by case, not only the size of the power elements, but also the switching frequency and a certain normal-operation duty-cycle.

In any case, for relatively high values of the switched current, conduction losses will become predominant, while for relatively low current levels (e.g. during idle periods in which the load level of the converter and consequently the duty-cycle are reduced), switching losses become more and more preeminent.

Several techniques are known for reducing the switching frequency of the power switch of the converter when the level of load drops, in order to increase the overall conversion efficiency of the system.

The known solutions may be classified in two distinct groups:

a) in the first group of solutions the control circuit of the converter is completely deactivated when the level of the load drops with the exception of the circuit that manages the turn-off phase, and is reactivated when the output voltage drops below a preset minimum threshold value, to be deactivated again when the output voltage rises above a preset maximum threshold value;

b) in the second group of solutions the control system of the power switch of the converter is always active, but the switch is caused to switch by a short burst of limited duration, which is established by the time necessary for the output voltage, having dropped below a minimum threshold, to rise again above a certain maximum threshold.

The known solutions of the first kind have the drawback, for example, in case of an integrated converter where the power switch (transistor) is also integrated (though not exclusively in such a case), that it is necessary to leave active the portion of the control circuit that directly controls the turning on and off of the power transistor. In conclusion, the limited saving that is achieved may be negatively counterbalanced by an increased circuit complexity, in view of the need to introduce dedicated monitoring circuits of the state of internal voltages of the circuit.

The known solutions of the second type, though offering a valid alternative in situations that would exclude the possibility of adopting solutions of the first type, are far from being optimal from the point of view of the power saving, because also during idle phases of operation of the converter, non-negligible switching losses persist during burst periods.

In order to reduce the switching losses during phases of operation in a burst mode, several methods have been proposed to reduce the burst frequency. This type of approach is used in the commercial device designated MAX 786 of Maxim Integrated Products, Sunnyvale (Calif.), U.S.A. (This chip and its data sheet are both hereby incorporated by reference.) The system employs a comparator for fixing a minimum threshold value of the current that circulates in the inductance of the converter, suitable to command a pulse skipping mode of operation as long as the current through the inductance remains below the minimum threshold value set by the comparator. The system skipping many of the pulses of the local oscillator or of the timing clock signal, thus reducing the switching frequency during idle periods of operation. Although reducing switching losses, the system remains ineffective in reducing switching losses when, because of a particularly low input voltage, the slope with which the current through the inductance of the converter rises is so small as to require several clock cycles at the maximum duty-cycle (limited by the transition from 1 to 0 of the clock signal that is applied to a set input of a driving flip-flop), to reach the minimum threshold value fixed by the comparator. In this case, the switch of the converter nevertheless continues to switch at the maximum duty-cycle, until the current through the inductor reaches the minimum threshold.

INNOVATIVE METHOD AND SYSTEM

An improved method of operation in a pulse skipping mode has now been found which is capable of optimizing the efficiency of the converter under any condition of operation and in particular also during an idle mode of operation in a pulse skipping mode, in the presence of a particularly low input voltage.

Basically, the system of the invention consists in masking the OFF interval of the clock signal that commonly drives a "set" input of a driving flip-flop of the power switch of the converter, as long as the level of the current through the inductor of the converter reaches a minimum threshold established by a comparator.

In practice, the switch of the converter is kept closed (ON) for the whole period of time necessary for the current flowing through the inductor to raise up to the minimum threshold, irrespective of the number of clock (or local oscillator) cycles to which such a rising process of the current flowing through the inductor up to the minimum threshold corresponds.

This substantially eliminates any undue switching loss during idle periods of operation (that is at a relatively light load level) of the converter, thus minimizing the switching frequency overall. The method of the invention may be implemented by employing a first logic gate (for example a NAND gate) to receive at one of its inputs the timing signal from a clock or from a local oscillator circuit, and at another input thereof a signal corresponding to a logic sum of the signal produced by the comparator that fixes the minimum current threshold and the driving signal of the switch of the converter, the output of this gate provides a masking signal of the "1" to "0" transition of the timing signal that commonly limits the maximum duty-cycle by being applied to a "set" input of a driving flip-flop. The masking may be implemented by actually driving the switch of the converter through a second gate (for example a second NAND gate), to the inputs of which said masking signal and said driving signal produced at the output of the flip-flop are applied.

The logic sum signal of the output signal of the comparator that fixes the minimum current threshold and of the driving signal, is combined by a logic gate (for example an AND gate) with the signal produced by a PWM control loop, for driving a "reset" input of the flip-flop.

BRIEF DESCRIPTION OF THE DRAWING

The different aspects and advantages of the invention will become more evident through the following description of a sample embodiment and by referring to the annexed drawings, wherein.

DETAILED DESCRIPTION OF THE PREFERRED EMBODIMENTS

Figure 1:
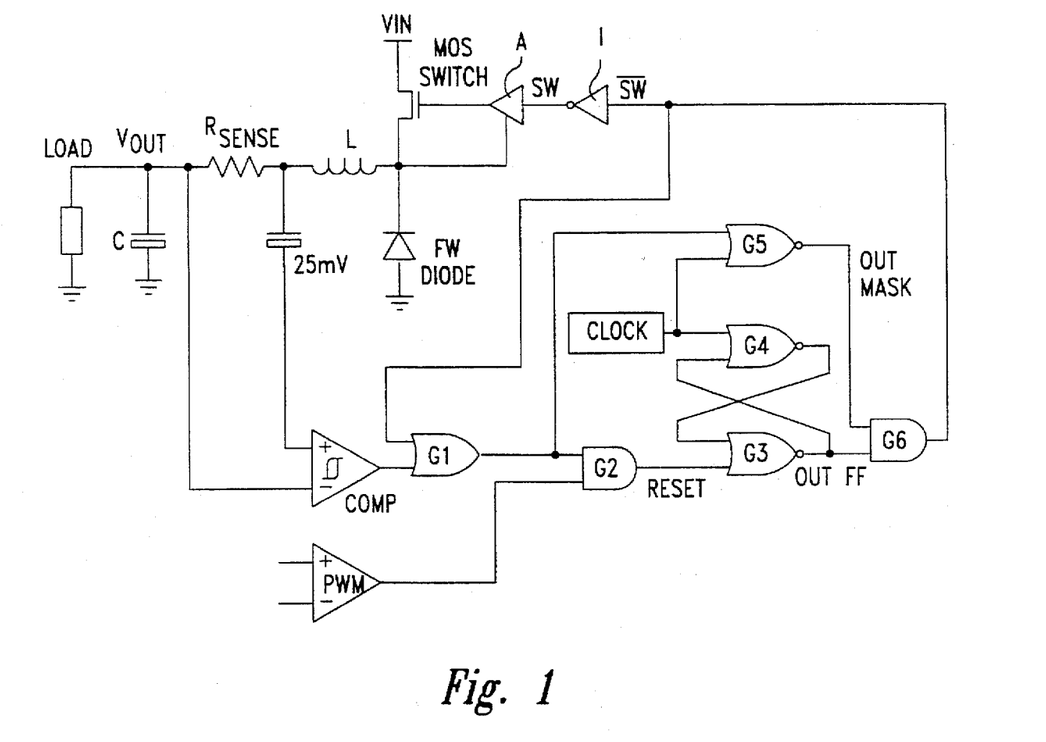
FIG. 1 is a partial circuit scheme of a DC-to-DC buck converter (stepdown converter) made according to the present invention.
Figure 2A:
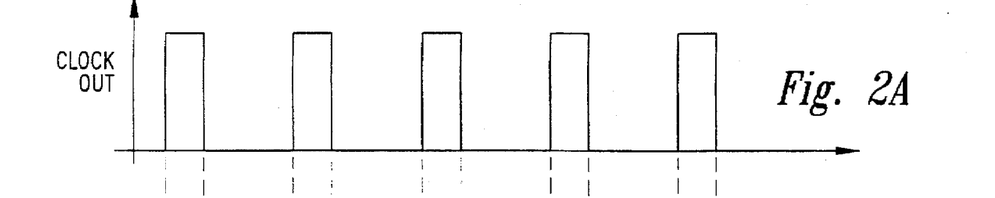
FIGS. 2A–2E show the timing diagrams of the circuit of FIG. 1 under normal operation conditions.
Figure 2B:
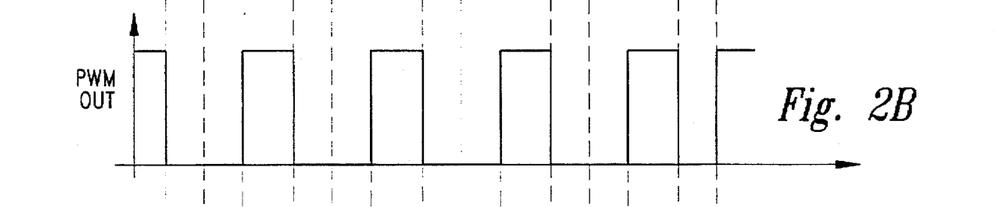
Figure 2C:
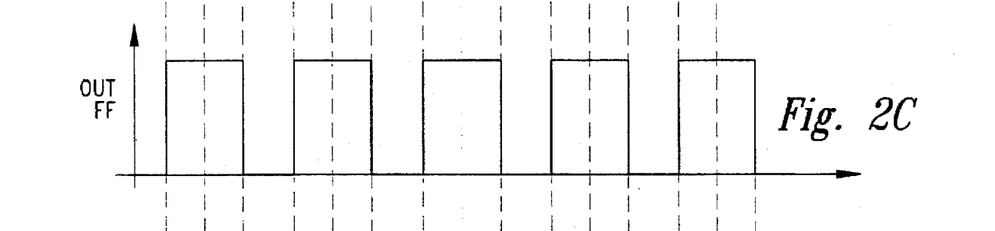
Figure 2D:
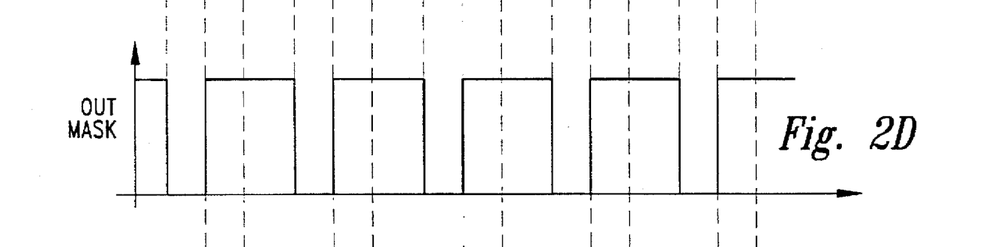
Figure 2E:
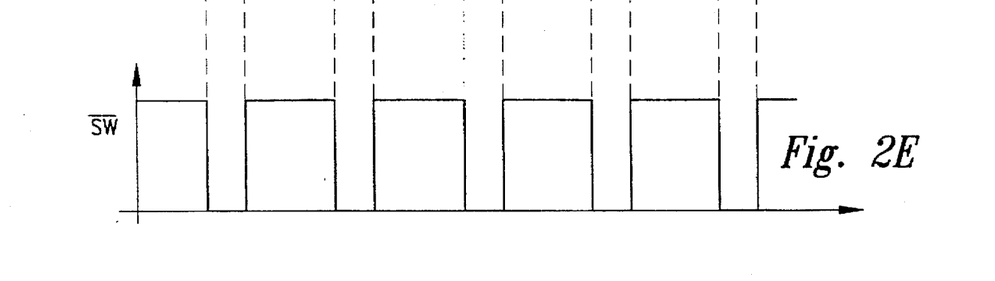
Figure 3A:
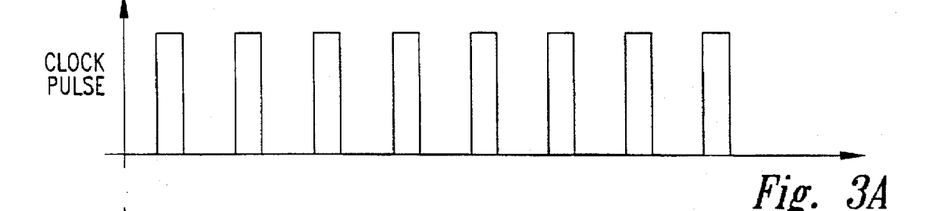
FIGS. 3A–3F show a series of timing diagrams and relative waveforms of the voltages of the converter circuit, under idle conditions of operation (i.e. at light load level)
Figures 3B, 3C:
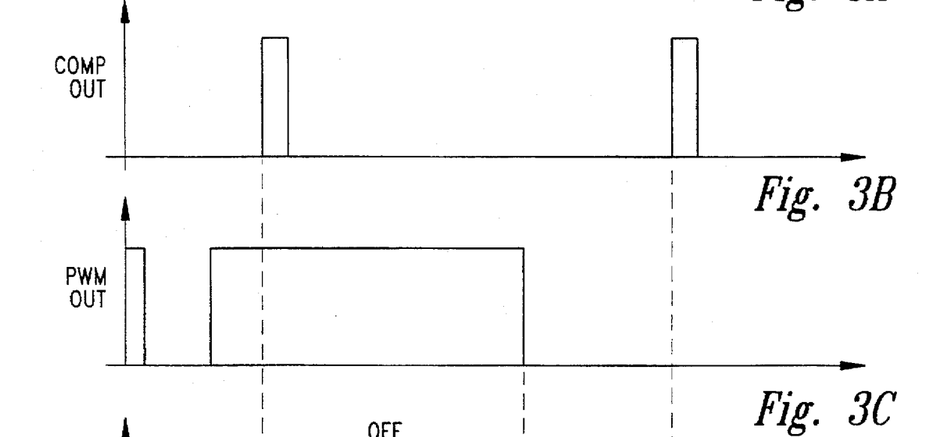
Figure 3D:
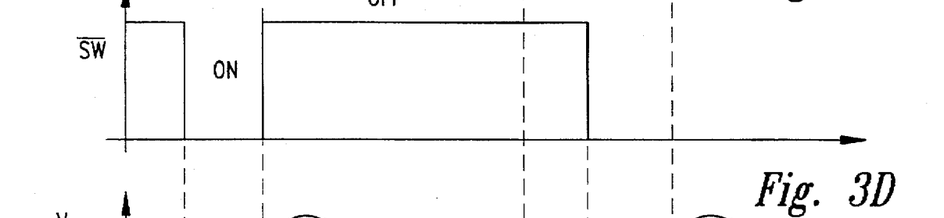
Figure 3E:
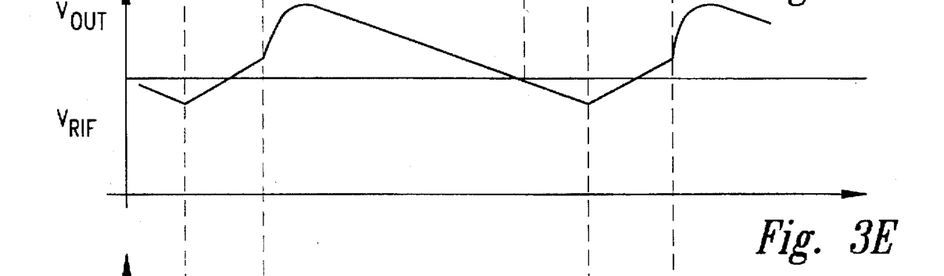
Figure 3F:
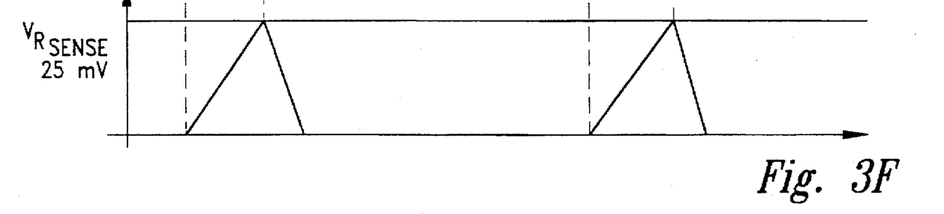

The numerous innovative teachings of the present application will be described with particular reference to the presently preferred embodiment (by way of example, and not of limitation), in which:

A partial block diagram of a stepdown DC-to-DC converter (commonly known as "buck" converter) controlled in a current mode by a PWM control loop, is depicted in FIG. 1. In order to avoid overburdening the figures, the circuit of the current mode PWM control loop has been omitted from the block diagram of FIG. 1 by schematically representing it by a PWM comparator suitable to output a turn-off signal for the switch of the converter. Of course, the whole PWM control loop will normally comprise an error amplifier and an amplifier of the voltage present across the sensing resistance (Rsens) for monitoring the current that flows through the inductor L of the power circuit of the converter. The power circuit of the converter further comprises a switch, represented in the shown sample by a power MOS transistor (MOS switch), a discharge diode (FW diode) and an output storage capacitor (C).

Of course, a typical PWM control circuit of the state of the power switch of the converter may also comprise a timing clock circuit (which may be substituted by a local oscillator), a driving flip-flop of the switch of the converter, as represented in the scheme of FIG. 1 by the cross-coupled pair of NOR circuits G4 and G3, as well as the driving buffer stages I and A.

The block diagram of FIG. 1 evidences the elements that implement the method of the invention for minimizing switching losses during an idling phase of operation (idle mode of operation) of the converter. These elements are represented by the offset comparator COMP and by the logic circuits G1, G2, G5 and G6. Typically, the current mode PWM control system, symbolically represented in the figure by the comparator PWM, outputs a logic signal which normally forces the turning off of the switch of the converter when the signal is at a logic "1" while permitting the turning on of the switch by the clock signal when at a logic "0".

According to a known technique for implementing a so-called pulse skipping mode of operation of the converter during an idle state, a comparator COMP provided with a certain offset, for example of about 25 mV, detects the voltage across the same current sensing resistance Rsens employed by the PWM control loop.

Under normal operating conditions of the converter (that is with a non-negligible current absorption by the load), the system functions in the following manner.

Assuming that the output of the comparator COMP is at "1", the logic circuits G2 and G5 are not affected by the signal SW\. A "0" to "1" transition of the clock signal "sets" the flip-flop G3/G4, while its reset input node is at "0" (assuming that the PWM loop is in a condition as to permit the turning on of the power transistor that constitutes the switch of the converter).

Nevertheless, the switch will not be closed (on) yet, because through G5 that has its own output at "0", the driving signal SW\ is forced to "1". When masking of the clock signal terminates, that is when the clock signal returns to "0", the output of G5 goes to "1" and the output of "G6" (SW\) goes to "0", thus turning on the power transistor.

Upon the turning on of the power transistor, the voltage across the sensing resistance $R_{SENSE}$ increases and at a certain point the PWM control loop will command the turning off of the power transistor through a transition from "0" to "1" of the output of the PWM comparator.

Upon the return to "0" of the output of the PWM comparator, the switch turns on again at the next transition from "1" to "0" of the clock signal and so forth.

This mode of operation under normal load conditions is represented in FIG. 2 by the relative timing signals.

When, in a low output current condition, the peak value of the current that circulates through the inductor L and therefore through $R_{SENSE}$ falls below a certain level determined by a voltage drop lower than 25 mV across the sensing resistance $R_{SENSE}$, the output of the comparator COMP goes to "0".

The circuit of the invention characterized by the logic gates G1, G2, G5 and G6 is such that, when the output of the comparator COMP is at "0", any turn-off command of the power switch by the PWM control loop is inhibited.

The function of the circuit is such that as long as the output of the comparator COMP remains at "0" the following effects are obtained.

The power switch remains ON also if the PWM loop would command to switch it off with a consequent moderate increase of the output voltage beyond the regulation value.

Once the power switch is turned off following a transition of the comparator COMP from "0" to "1", because of the extra energy that has been transferred to the output capacitor C (slight increase of the Vout voltage above the regulation value), the PWM control loop remains with its output node at "1", thus forcing, together with the signal S1 (also at "1")

the resetting of the flip-flop. This determines the skipping of a certain number of clock cycles with a net result of a reduction of the overall switching frequency.

As soon as the PWM comparator changes its output state from "1" to "0" (that is Vout>Vrif), the turning on of the power switch is again permitted at the subsequent clock pulse, thus restarting the cycle again.

The timing diagrams shown in FIG. 3 show this particular mode of operation. For greater detail, in FIG. 3 are shown also the respective diagrams of the output voltage Vout and of the voltage VRsens on the sensing resistance.

As may be observed from the timing diagrams of FIG. 3 and from the block diagram of FIG. 1, differently from known control circuits that implement a skipping pulse mode of operation under low current absorption conditions, the control circuit of the invention performs a masking of the OFF period (transition from "1" to "0") of the clock signal, by means of the NAND gate G5. This permits to achieve an operating mode that really minimizes the number of switching transitions under any condition of operation, thus allowing a great freedom in the choice of the inductance L.

As a matter of fact, two different situations of operation in a skipping pulse mode may be distinguished.

Figure 4A:
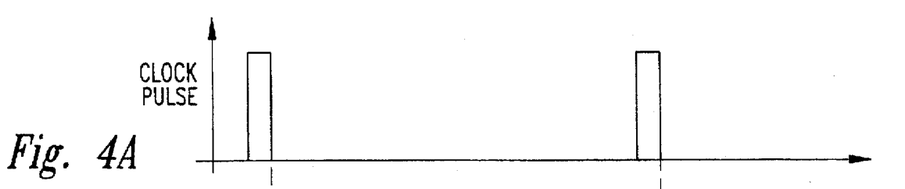
FIGS. 4A and 4B show a first idle condition of operation.
Figure 4B:
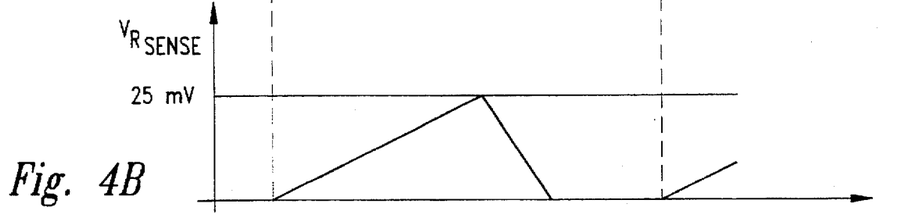

In a first case, qualitatively illustrated by the timing diagrams of FIG. 4, the slope with which the current through the inductor rises, for example in presence of a relatively high input voltage (supply voltage) Vin, is sufficiently steep as to permit the reaching of the minimum current threshold (equivalent to a voltage drop of at least 25 mV across Rsens) within a clock period.

There are, however, different situations, wherein either because of the particular value of inductance used and/or because of an excessively low input voltage (Vin), the slope with which the current through the inductor raises is such as to require several clock periods (at the maximum duty-cycle) in order to reach the minimum current threshold (at least 25 mV across Rsens).

Figure 5A:
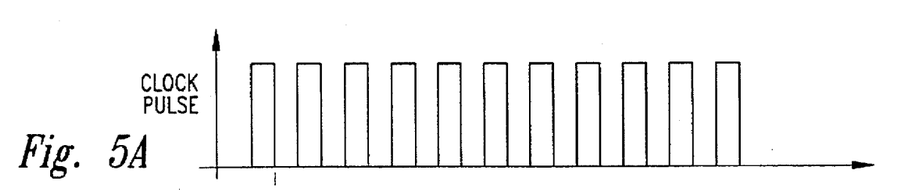
FIGS. 5A and 5B show a second idle condition of operation.
Figure 5B:
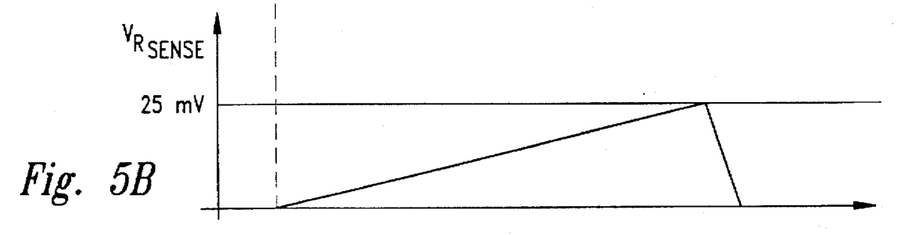

Also in this last condition of operation, the circuit of the invention prevents the turning off of the power switch of the converter for as long as such a minimum current threshold is reached. This is illustratively depicted by the timing diagrams of FIG. 5.

Figure 6A:
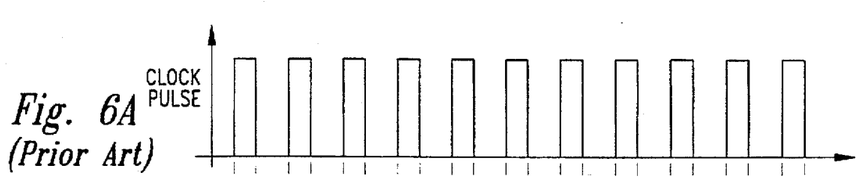
FIGS. 6A–6C place in evidence for comparative purposes, a mode of operation of a converter made according to the prior art when functioning in an idle mode similar to the one depicted in the preceding FIGS. 5A and 5B.
Figure 6B:
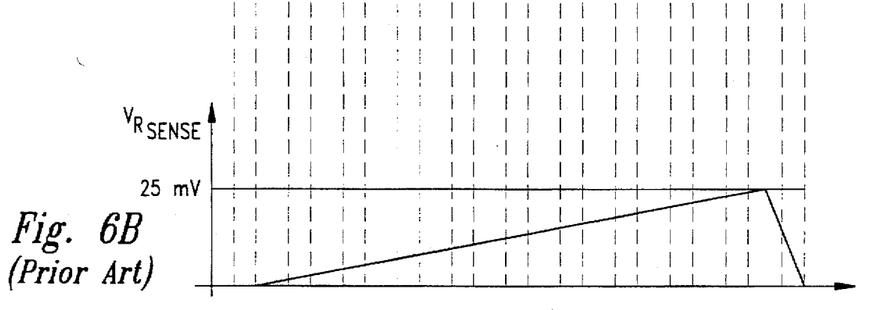
Figure 6C:
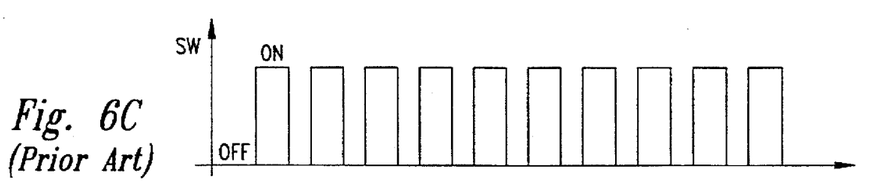

By contrast, in known systems, wherein the masking of the clock signal that forces the turning off of the power switch at the allowed maximum duty-cycle is "permanently" active, a plurality of switching transitions of the power switch, accompanied by relative switching losses, occur nevertheless. For comparison reasons, the operation diagrams of known systems are shown in FIG. 6.

It is evident how the circuit of the invention attains a total optimization by eliminating unnecessary multiple switching transitions. This is achieved by inhibiting the turning off of the power switch of the converter for as long as the current through the inductor reaches a minimum threshold value determined by the offset of the comparator COMP. In practice, the overall switching frequency is effectively minimized also under conditions of no current absorption by the load of the converter (idle mode) to the advantage of the overall conversion efficiency of the converter.

SAMPLE INTEGRATED CIRCUIT EMBODIMENT

An example of an integrated circuit in which the innovative ideas described above have advantageously been implemented will now be described. However, these ideas can be used in many possible contexts, and this integrated circuit is merely one example of numerous possible integrated circuit embodiments.

This sample embodiment is the "U541 TWINS ASIC." This chip is a sophisticated dual controller and power monitor intended for use in a mobile system. With a minimum number of external components, this chip produces regulated 3.3V, 5.1V and 12V supplies for use in portable and PCMCIA applications (e.g. Notebook Computer, Portable data terminals, Communications Computers, and Pen-Entry Systems).

The 3.3V and 5.1V lines are monitored for over-voltage, under-voltage and over-current conditions. On detection of a fault, appropriate action is taken to prevent physical damage and date corruption.

Several power features and low power modes of operation allow high converter efficiency even under low load standby conditions.

Thus some significant features of this chip include: Dual PWM Buck Controllers (3.3V and 5.1V); 5.5V to 20V Input Range; # High Efficiency; Low Quiescent Current; # Low Standby Current; Small TSSOP 28 and SOIC 28 Package; 12V Low Drop Out Linear Regulator (150 mA); and Dedicated Start-up and Fault Detection.

Figure 7:
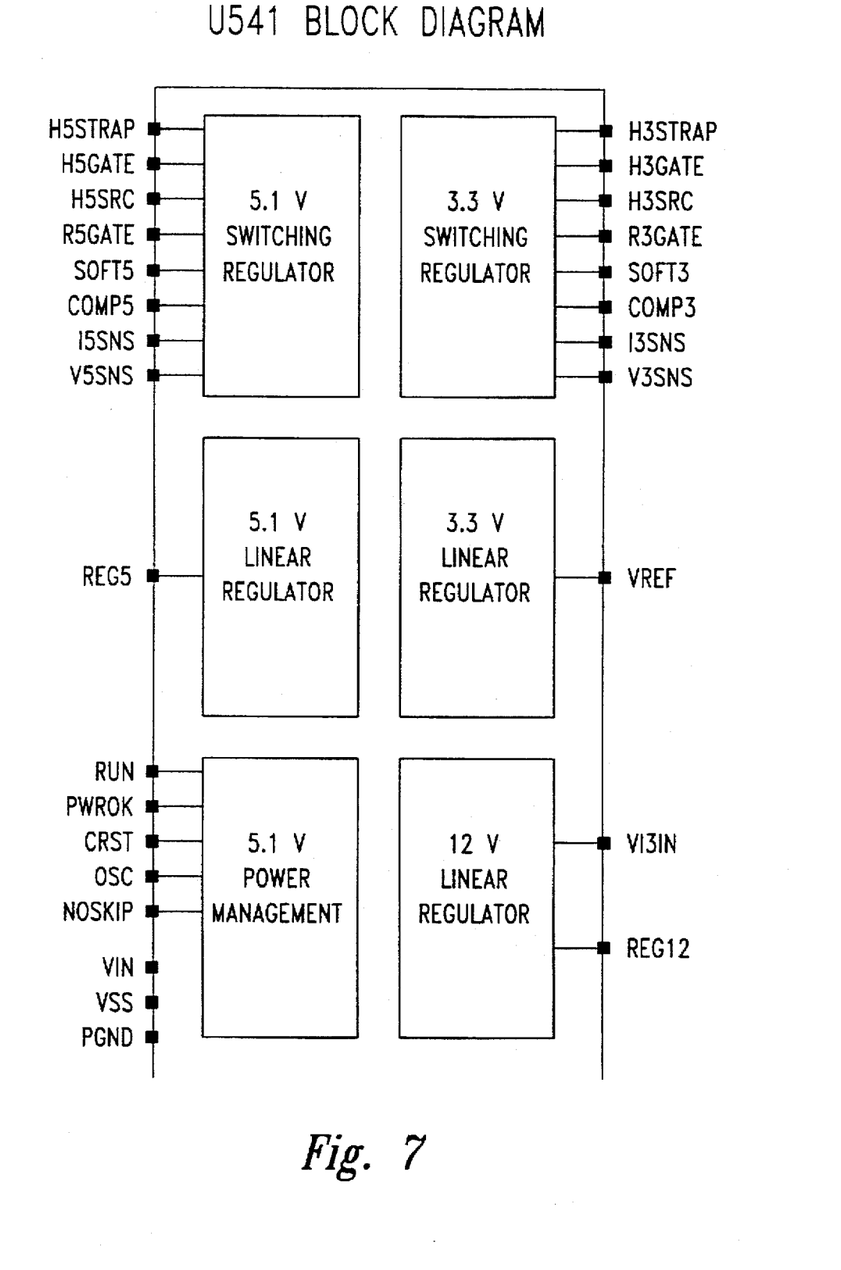
FIG. 7 is a block diagram example of a chip which incorporates the disclosed ideas.

FIG. 7 shows the overall organization of the chip. Note that FIVE regulators are provided: two switching regulators are used for the 5.1V and 3.3V supplies, and three linear regulators are used for the 5.1V, 3.3V, and 12V supplies.

Figure 8:
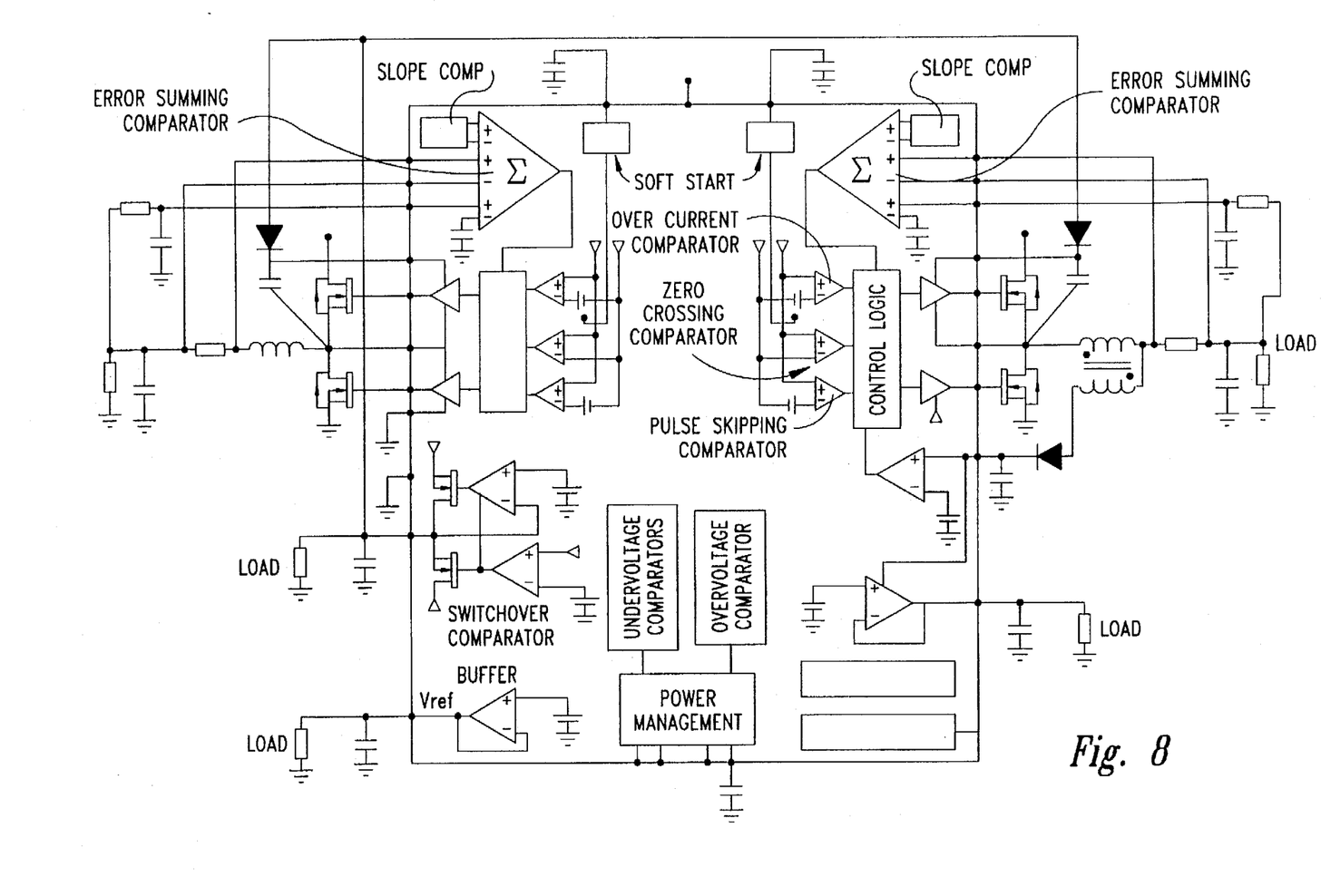
FIG. 8 shows further details of the architecture of this chip.

FIG. 8 shows more detail of the chip. Two switching regulators are shown, on left and right sides; note that both include a "Pulse Skipping Comparator," which is used to implement the functionality described above.

According to a disclosed class of innovative embodiments, there is provided: A method for reducing switching losses in a DC-to-DC converter with a current mode PWM control loop when idle which comprises fixing a certain minimum threshold value of the current flowing through the inductor of the converter, below which the overall switching frequency is reduced, characterized by inhibiting any intervening turn-off command of the switch of the converter by the PWM control loop as long as the current through the inductor remains below said minimum threshold value.

According to another disclosed class of innovative embodiments, there is provided: A DC-to-DC static converter composed of a power section which comprises at least a switch driven at a switching frequency set by a clock or local oscillator signal, an inductor, a discharge diode, an output storage capacitor, a PWM control loop suitable to control the duty-cycle of said switch by commanding the turning off in function of the current level in the inductor and of the output voltage of the converter, and a control circuit for reducing the overall switching frequency during idle periods as long as the current in the inductor remains below a minimum threshold value set by a comparator, characterized by comprising logic means capable of inhibiting any turn-off command of said PWM control loop switch of the converter for as long as the current in the inductor remains below said minimum threshold value.

According to another disclosed class of innovative embodiments, there is provided: A static DC-to-DC converter composed of a power section which comprises at least a switch switching at a frequency set by a clock or local oscillator timing signal, an inductor, a discharge diode and an output storage capacitor charged by the discharge current of said inductor, a PWM control loop comprising an error amplifier and a comparator for controlling the duty-cycle of said switch in function of the current in the inductor as detected by a sensing resistance and the output voltage on said storage capacitor, a flip-flop driving said switch and having a "set" input to receive said timing signal and a reset input for receiving a control signal produced by said PWM control loop, at least a second comparator, the inputs of which are functionally connected to said sensing resistance, characterized by comprising a first OR logic circuit having a first input connected to the output of said second comparator, a second input to which a drive signal of said switch is applied and an output; a second AND logic circuit having a first input connected to the output of said first OR logic circuit, a second input connected to an output of said PWM control loop and an output connected to said reset input of said driving flip-flop; a third NAND logic circuit having a first input connected to the output of said first OR logic circuit, a second input connected to said set input of said flip-flop and an output; a fourth NAND logic circuit having an input connected to an output of said flip-flop, a second input connected to the output of said third NAND logic circuit and an output connected to a control terminal of said switch.

MODIFICATIONS AND VARIATIONS

As will be recognized by those skilled in the art, the innovative concepts described in the present application can be modified and varied over a tremendous range of applications, and accordingly the scope of patented subject matter is not limited by any of the specific exemplary teachings given. For example, as will be obvious to those of ordinary skill in the art, other circuit elements can be added to, or substituted into, the specific circuit topologies shown.

What is claimed is:

1. A method for reducing switching losses in a DC-to-DC converter with a current mode PWM control loop when idle which comprises fixing a certain minimum threshold value of the current flowing through the inductor of the converter, below which the overall switching frequency is reduced, inhibiting any intervening turn-off command of the switch of the converter by the PWM control loop as long as the current through the inductor remains below said minimum threshold value.

2. A method as defined in claim 1, wherein said inhibiting is implemented by masking the switching to a logic "0" of a high frequency timing signal of the converter for the entire period of time said current remains below said minimum threshold value.

3. The method of claim 1, wherein said converter is a buck converter.

4. The method of claim 1, wherein said minimum threshold value is defined by sensing the voltage drop across a resistor which is in series with the inductor.

5. The method of claim 1, wherein said reduction of the overall switching frequency is accomplished by pulse skipping.

6. The method of claim 1, wherein said inhibiting step is performed without inhibiting clock pulses.

7. The method of claim 1, wherein said inhibiting step is performed by inhibiting clock pulses.

8. A DC-to-DC static converter composed of a power section which comprises at least a switch driven at a switching frequency set by a clock or local oscillator signal, an inductor, a discharge diode, an output storage capacitor, a PWM control loop suitable to control the duty-cycle of said switch by commanding the turning off in function of the current level in the inductor and of the output voltage of the converter, and a control circuit for reducing the overall switching frequency during idle periods as long as the current in the inductor remains below a minimum threshold value set by a comparator, comprising logic means capable of inhibiting any turn-off command of said PWM control loop switch of the converter for as long as the current in the inductor remains below said minimum threshold value.

9. The converter of claim 8, wherein said switch is a power field-effect transistor.

10. A converter as defined in claim 4, wherein said logic means mask the transition to "0" of said clock or local oscillator signal.

11. A method for operating a power converter, comprising the steps of:

(A.) sensing the level of output to a load;

(B.) under normal load conditions, operating a pulse-width modulator circuit, in dependence on said sensing step (A.), to switch a switching transistor which drives an inductor, and thereby provide at least a desired level of output to the load; and (C.) under low load conditions, inhibiting turn-off of said transistor is inhibited for as long as the current through said inductor is below a threshold value; whereby switching losses are minimized.

12. The method of claim 11, wherein said transistor is a power field-effect transistor.

13. The method of claim 11, wherein said inhibiting step is performed without inhibiting clock pulses.

14. The method of claim 11, wherein said sensing step uses a resistor which is connected in series with said inductor, and a comparator connected to sense the voltage across said resistor.

15. The method of claim 11, wherein said inductor is connected in a buck converter configuration.

16. A power converter circuit comprising:

a load connection for applying an electrical power output to a load;

at least one inductor element, and a switching transistor connected to drive said inductor element;

sensing circuitry which senses the current through said inductor element; and a pulse-width modulator circuit, operatively connected to receive an input from said sensing element, and operatively connected to repeatedly switch said transistor, under normal conditions, to provide at least a desired level of output to said load connection;

and further comprising inhibit logic operatively connected to prevent said transistor from turning off, under low load conditions, for as long as the current through said inductor is below a threshold value.

17. The circuit of claim 16, wherein said sensing circuitry comprises a resistor which is connected in series with said inductor, and a comparator connected to sense the voltage across said resistor.

18. The circuit of claim 16, wherein said transistor is a power field-effect transistor.

19. The circuit of claim 16, wherein said inductor is connected in a buck converter configuration.

20. A static DC-to-DC converter composed of a power section which comprises at least a switch switching at a frequency set by a clock or local oscillator timing signal, an inductor, a discharge diode and an output storage capacitor charged by the discharge current of said inductor, a PWM control loop comprising an error amplifier and a comparator for controlling the duty-cycle of said switch in function of the current in the inductor as detected by a sensing resistance and the output voltage on said storage capacitor, a flip-flop driving said switch and having a "set" input to receive said timing signal and a reset input for receiving a control signal produced by said PWM control loop, at least a second comparator, the inputs of which are functionally connected to said sensing resistance, characterized by comprising

- a first OR logic circuit having a first input connected to the output of said second comparator, a second input to which a drive signal of said switch is applied and an output;
- a second AND logic circuit having a first input connected to the output of said first OR logic circuit, a second input connected to an output of said PWM control loop and an output connected to said reset input of said driving flip-flop;
- a third NAND logic circuit having a first input connected to the output of said first OR logic circuit, a second input connected to said set input of said flip-flop and an output;
- a fourth NAND logic circuit having an input connected to an output of said flip-flop, a second input connected to the output of said third NAND logic circuit and an output connected to a control terminal of said switch.

* * * * *